(12) United States Patent
Chen et al.

(10) Patent No.: US 8,810,362 B2
(45) Date of Patent: Aug. 19, 2014

(54) RECOGNITION SYSTEM AND RECOGNITION METHOD

(75) Inventors: Yu-Han Chen, Hsinchu County (TW); Ming-Tsan Kao, Hsinchu County (TW); Chih-Hung Lu, Hsinchu County (TW)

(73) Assignee: Pixart Imaging Inc., Hsinchu County (TW)

( * ) Notice: Subject to any disclaimer, the term of this patent is extended or adjusted under 35 U.S.C. 154(b) by 189 days.

(21) Appl. No.: 13/239,855

(22) Filed: Sep. 22, 2011

(65) Prior Publication Data

US 2012/0249293 A1  Oct. 4, 2012

(30) Foreign Application Priority Data

Mar. 30, 2011  (TW) .............................. 100111140 A (51) Int. Cl.
  *G06K 9/46* (2006.01)
  *G06F 21/32* (2013.01)
  *G06F 3/01* (2006.01)
  *G06F 1/32* (2006.01)
  *G06K 9/00* (2006.01)

(52) U.S. Cl.
  CPC ................ *G06F 21/32* (2013.01); *G06F 3/017* (2013.01); *G06F 1/3231* (2013.01); *G06K 9/00248* (2013.01); *G06K 9/00268* (2013.01); *G06K 9/00302* (2013.01); *G06K 9/00308* (2013.01); *G06K 9/00315* (2013.01); *G06K 9/00221* (2013.01)
  USPC ......... 340/5.52; 340/5.53; 340/5.8; 340/5.81; 340/5.82

(58) Field of Classification Search
  CPC . G06F 21/32; G06F 21/3231; G06K 9/00248; G06K 9/00268; G06K 9/00302; G06K 9/00308; G06K 9/00315; G06K 9/00221
  USPC ............ 340/5.52, 5.53, 5.8, 5.81, 5.82, 5.83, 340/5.84, 5.85, 5.86; 382/115, 305, 116, 382/118, 117, 124; 704/273, 246; 902/3; 713/186
  See application file for complete search history.

(56) References Cited

U.S. PATENT DOCUMENTS 5,844,824 A * 12/1998 Newman et al. ............... 345/156
6,480,825 B1 * 11/2002 Sharma et al. ................. 704/270
(Continued)

OTHER PUBLICATIONS

Luis Von Ahn, et al, reCAPTCHA: Human-Based Character Recognition via Web Security Measures, Science, 2008, V321, No. 5895, pp. 1465-1468.

(Continued)

*Primary Examiner* — Daniel Wu
*Assistant Examiner* — Benyam Haile
(74) *Attorney, Agent, or Firm* — Morris Manning & Martin LLP; Tim Tingkang Xia, Esq.

(57) ABSTRACT

A recognition system is used for recognizing an operation of a user. The recognition system includes a sensor module, a processing device, a playing device, and data storage device. The sensor module is used for generating a first sensing signal according to an operation of a user. The data storage device stores a plurality of objects. The processing device compares the first sensing signal with the plurality of objects to generate a recognition result in response to the first sensing signal. The playing device is used for playing the recognition result. The sensor module is used for, after the recognition result is played, recognizing a response of the user to generate a second sensing signal, and feeding the second sensing signal back to the processing device. The processing device judges whether the recognition result corresponding to the first sensing signal is correct according to the second sensing signal.

15 Claims, 6 Drawing Sheets

(56) References Cited

U.S. PATENT DOCUMENTS

| | | | |
|---|---|---|---|
| 6,920,236 B2 | 7/2005 | Prokoski | |
| 7,826,464 B2 * | 11/2010 | Fedorov | 370/401 |
| 8,363,951 B2 * | 1/2013 | Bigioi et al. | 382/190 |
| 2002/0109579 A1 | 8/2002 | Pollard et al. | |
| 2006/0126905 A1 | 6/2006 | Loo | |
| 2009/0034805 A1 * | 2/2009 | Perlmutter et al. | 382/118 |
| 2009/0055193 A1 * | 2/2009 | Maislos et al. | 704/273 |
| 2009/0238419 A1 * | 9/2009 | Steinberg et al. | 382/118 |

OTHER PUBLICATIONS

Shenoy et al., Human-Aided Computing: Utilizing Implicit Human Processing to Classify Images, CHI'08 Proceeding of the twenty-sixth annual SIGCHI conference on Human factors in computing systems, 2008, New York, NY, USA.

Sun et al., Image Completion with Structure Propagation. SIGGRAPH 2005, vol. 24, pp. 861-868.

Zou et al., Visible models for interactive pattern recognition, Pattern Recognition Letters, 2007, V28, pp. 2335-2342.

* cited by examiner

RECOGNITION SYSTEM AND RECOGNITION METHOD

CROSS-REFERENCE TO RELATED APPLICATIONS

This non-provisional application claims priority under 35 U.S.C. §119(a) on Patent Application No. 100111140 filed in Taiwan, R.O.C. on Mar. 30, 2011, the entire contents of which are hereby incorporated by reference.

BACKGROUND

1. Field of Invention

The present invention relates to a recognition system and a recognition method, and more particularly to a recognition system and a recognition method capable of recognizing an operation of a user.

2. Related Art

With the ongoing development of the digital technologies, a biological feature recognition system is currently widely applied. For example, the biological feature recognition system is capable of sampling features of a user such as fingerprints, irises, facial patterns or voice prints, and performing analysis and comparison, so as to judge a practical identity of the user.

The biological feature recognition system can be used for access control and security, medical care, or robots. In combination with the identity recognition of the user, various personal and automatic services are performed, so as to save the labor cost.

SUMMARY

The recognition system comprises a sensor module, a processing device, a playing device, and a data storage device.

The sensor module is used for generating a first sensing signal according to an operation of a user. The data storage device storage has a plurality of objects. The processing device compares the first sensing signal with the plurality of objects to generate a recognition result in response to the first sensing signal. The playing device is used for playing the recognition result. The sensor module is used for, after the recognition result is played, recognizing a response of the user to generate a second sensing signal, and feeding the second sensing signal back to the processing device. The processing device judges whether the recognition result is acceptable or correct according to the second sensing signal.

The sensor module has a primary sensor device and a secondary sensor device. The primary sensor device is used for recognizing the operation of the user and generating the first sensing signal, and the secondary sensor device is used for recognizing the response of the user and generating the second sensing signal.

The disclosure further provides a recognition method, which comprises: providing a sensor module, a processing device, and a playing device; acquiring a plurality of objects in a data storage device; generating, by the sensor module, a first sensing signal according to an operation of a user; comparing, by the processing device, a plurality of objects and the first sensing signal, so as to generate a recognition result in response to the first sensing signal; playing, by the playing device, the recognition result; recognizing, by the sensor module, a response of the user to generate a second sensing signal, and feeding the second sensing signal back to the processing device; and judging whether the recognition result is acceptable according to the second sensing signal.

BRIEF DESCRIPTION OF THE DRAWINGS

The disclosure will become more fully understood from the detailed description given herein below for illustration only, and thus are not limitative of the present invention, and wherein.

DETAILED DESCRIPTION

Figure 1:
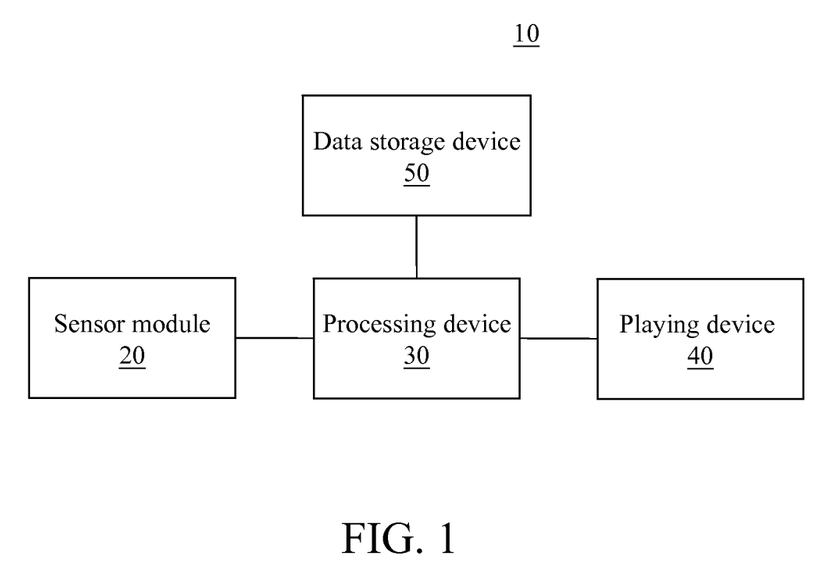
FIG. 1 is a system block diagram of a recognition system according to a first embodiment.

FIG. 1 is a system block diagram of a recognition system. The recognition system 10 comprises a sensor module 20, a processing device 30, a playing device 40, and a data storage device 50.

The sensor module 20 is used for generating a first sensing signal according to an operation of a user. The operation of the user is a body or facial action, for example, the user approaches the sensor module 20 with the face or the user utters voice to the sensor module 20. The first sensing signal is an electronic signal, and the electronic signal represents a feature of the operation of user, for example, the bright and dark changes of the facial contour of the user or the amplitude of the voice signal.

The processing device 30 is electrically connected to the sensor module 20, and is used for receiving the first sensing signal. The processing device 30 generates a recognition result in response to the first sensing signal. The processing device 30 analyzes the first sensing signal to obtain a plurality of feature values. Subsequently, the feature values are then compared with a preset value to obtain the recognition result. The recognition result may represent an identity of the user (a name or a code of the user), or information (race or gender) represented by the user.

The playing device 40 is electrically connected to the processing device 30, and may receive the recognition result. After receiving the recognition result, the playing device 40 plays the recognition result, so that the user may know the result right away. In addition, the playing device 40 may also prompt a response that the user can make to the recognition result after knowing the recognition result. For example, the playing device 40 may prompt that the user nods the head when thinking that the recognition result is correct and shakes the head when thinking that the recognition result is fault.

The data storage device 50 may be a medium capable of storing digital data, such as a non-volatile memory, a hard disk, or a disk array. The data storage device 50 stores a plurality of objects, and the objects may correspond to image features or voice features of the user. The processing device 30 compares the first sensing signal with the plurality of objects, so as to generate a recognition result.

After the recognition result is played, the sensor module 20 is used for recognizing a response of the user. The sensor module 20 further generates a second sensing signal according to the response of the user. The second sensing signal is fed back to the processing device 30, so the processing device 30 judges whether the recognition result is correct or acceptable according to the second sensing signal. That is to say, if the sensor module 20 recognizes that the second sensing signal satisfies a first preset feature (for example, nodding the head), it is judged that the recognition result is correct. When the sensor module 20 recognizes that the second sensing signal satisfies a second preset feature (for example, shaking the head), it is judged that the recognition result is fault. The processing device updates the data storage device according to the judged recognition result. Therefore, the recognition system 10 can correct a future judgment result according to whether the judgment result is correct or fault, so as to increase the judgment accuracy.

Figure 2:
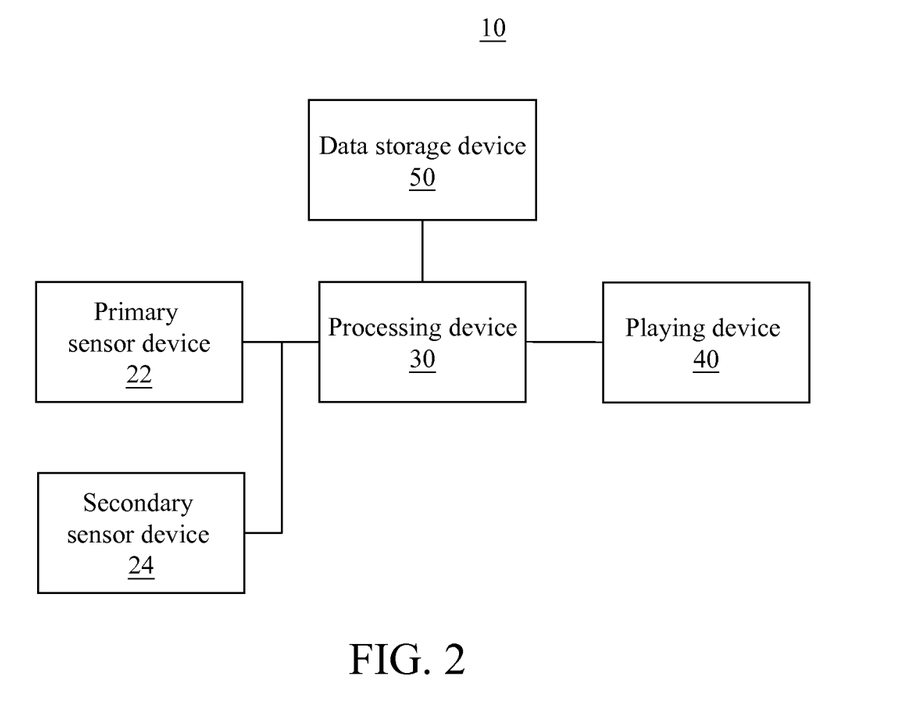
FIG. 2 is a system block diagram of a recognition system according to a second embodiment.

FIG. 2 is a detailed block diagram of a recognition system according to the present invention. The recognition system 10 comprises a primary sensor device 22, a secondary sensor device 24, a processing device 30, a playing device 40, and a data storage device 50.

In this embodiment, the sensor module 20 comprises the primary sensor device 22 and the secondary sensor device 24, which are respectively used for recognizing the operation and response of the user. The primary sensor device 22 is used for recognizing an operation of a user and generating a first sensing signal. The secondary sensor device 24 is used for recognizing a response of the user and generating a second sensing signal after the recognition result is played.

The primary sensor device 22 is an image sensor or a voice sensor device. The image sensor is used for generating an image signal. The image sensor may be a charge-coupled device (CCD) or a Complementary Metal Oxide Semiconductor (CMOS). The image sensor can convert an optical signal into an electric signal for ease of storage, transmission, or operation. The voice sensor is used for generating a voice signal. The voice sensor may be a microphone, and the voice sensor can convert a sound wave signal into an electric signal for ease of storage, transmission, or operation.

When the primary sensor device 22 is an image sensor, the objects stored in the data storage device 50 represent image features. The processing device 30 compares the image signal generated by the primary sensor device 22 with the plurality of objects in the data storage device 50, and selects one in the plurality of objects most similar to the image signal as the recognition result. The processing device 30 may perform difference calculation on the color value, gradient value or image frequency feature of the image signal and the plurality of objects in the data storage device 50. The object with the minimum difference may be regarded as the most similar object.

At this time, the playing device 40 is a display screen. The display screen may be, but not limited to, a Liquid Crystal Display (LCD), an Organic Light Emitting Diode (OLED), or an e-paper. The display screen is used for displaying the recognition result, for example, displaying the name of or the number represented by the user.

When the primary sensor device 22 is a voice sensor, the objects stored in the data storage device 50 represent voice features. The processing device 30 compares a voice signal and the plurality of objects in the data storage device 50, and in the plurality of objects, selects one most similar to the voice signal as the recognition result. The processing device 30 may perform difference calculation on the sound waves or the frequency features of the voice signal and the plurality of objects in the data storage device 50. The object with the minimum difference is regarded as the most similar object.

In this embodiment, the playing device 40 is a loudspeaker. The loudspeaker is used for emitting a voice, so as to play the recognition result, for example, read the name or number of the user.

The secondary sensor device 24 may be a touch sensor or a non-touch sensor. The touch sensor may comprise a mouse, a keyboard, or a touch screen, so as to be touched by the user and recognize an operation of a user. After seeing the display or hearing the played recognition result, the user may input with the secondary sensor device 24 to represent whether the recognition result is correct or fault. For example, the user may input "Y" with the keyboard, so as to represent the correct recognition result, and input "N" to represent the fault recognition result.

Furthermore, the non-touch sensor may be a sound sensor, an image sensor, or a brain wave sensor, so the user responds to the recognition result without touching the secondary sensor device. The image sensor device may detect the body action and facial expression of the user, the sound sensor may detect the sound uttered by the user, and the brain wave sensor may detect the brain wave of the user, so as to judge whether the recognition result is correct. For example, the image sensor may detect the behavior of the user, the user draws a circle with the hand, representing the correct recognition result, and the user draws a cross with the hand, representing the fault recognition result.

In addition, the secondary sensor device 24 may also be a physiological signal sensor. The secondary sensor device 24 may detect the physiological response that the user is unable to control voluntarily, comprising changes such as heartbeats, breath, blood pressure, and brain waves. Compared to the voluntarily controlled responses such as gestures and voices, the physiological signal is more difficult to pretend. Therefore, the cheating of the user may be prevented.

In addition to the embodiment, the processing device 30 may select, in the plurality of objects, several objects having the similarity reaching a threshold value, and calculates a first confidence value according to the similarity. For example, the processing device 30 may select Objects A, B, and C, the first confidence value of Object A is "70", the first confidence value of Object B is "20", and the first confidence value of Object C is "10".

The sensor device 20 (or the secondary sensor device 24) further respectively generates a second confidence value according to responses of the user to Objects A, B, and C. For example, the second confidence value of Object A is "50", the second confidence value of Object B is "10", and the second confidence value of Object C is "5".

Subsequently, the processing device 30 further generates the recognition result corresponding to the first confidence value and the second confidence value. In this embodiment, the processing device 30 may have the first confidence value and the second confidence value multiplied or added to obtain an integrated value. The processing device 30 judges whether the displayed Objects A, B, and C are correct recognition results according to the integrated values.

In order to further increase the reliability in use, the processing device 30 may set a critical value. When the integrated value reaches the critical value, it is judged that the recognition result is correct. Therefore, the possibility that the user increases the second confidence value on purpose to confuse the recognition system 10 to generate an fault recognition result is avoided.

The recognition system of the present invention is described in FIGS. 1 and 2. In FIGS. 3 to 6, the recognition method of the present invention is described, and the recognition method may be implemented by the recognition system in FIGS. 1 and 2.

Figure 3:
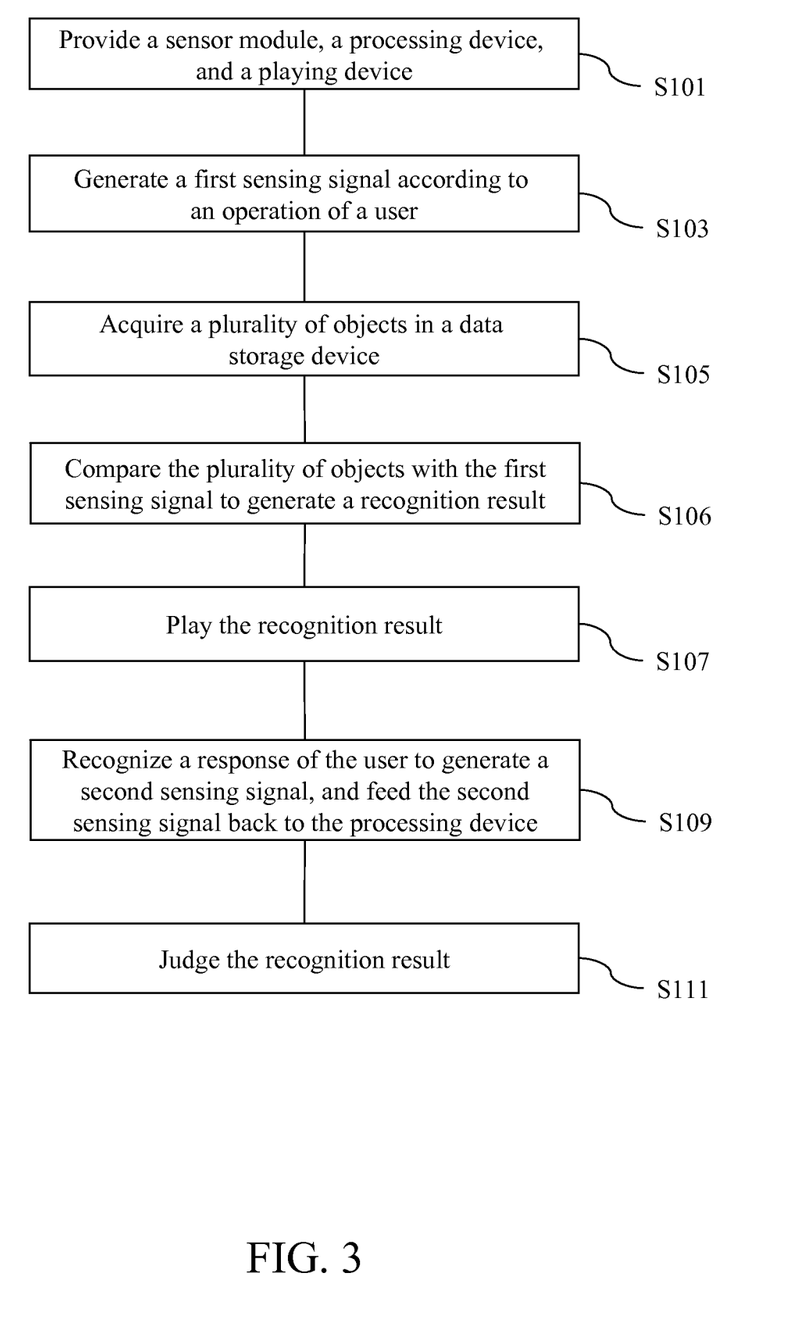
FIG. 3 is a first flow chart of a recognition method.

FIG. 3 is a first flow chart of a recognition method according to an embodiment of the present invention.

In Step S101, a sensor module 20, a processing device 30, and a playing device 40 are provided. The sensor module 20 may include a primary sensor device 22 and a secondary sensor device 24.

In Step S103, according to an operation of a user, the sensor module 20 may generate a first sensing signal. The sensor module 20 transmits the first sensing signal to the processing device 30.

In Step S105, a plurality of objects in the data storage device 50 are acquired. The objects represent image features or voice features.

In Step S106, the processing device 30 compares the plurality of objects to generate a recognition result in response to the first sensing signal. The processing device 30 may analyze the first sensing signal to obtain a plurality of feature values, and generates the recognition result by using the feature values.

In Step S107, the playing device 40 plays the recognition result. Therefore, the user may judge whether the recognition result corresponding to the first sensing signal is correct according to the picture displayed or the sound emitted by the playing device 40.

In Step S109, when the user sees the picture displayed or hears the sound emitted by the playing device 40, the sensor module 20 may recognizes a response of the user, so as to generate a second sensing signal. The sensor module 20 feeds the second sensing signal back to the processing device.

In Step S111, the processing device 30 judges whether the recognition result is correct according to the second sensing signal, that is, according to the response of the user.

Figure 4:
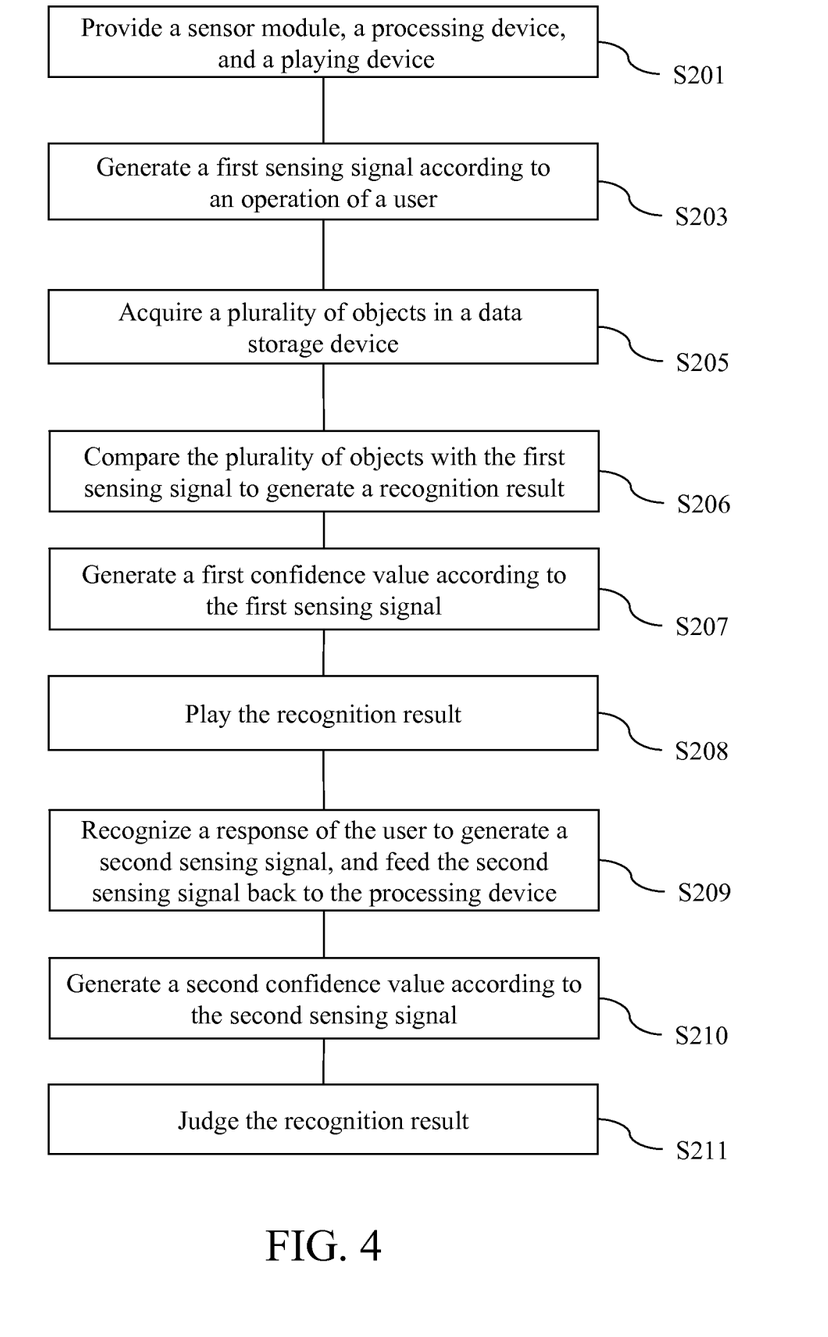
FIG. 4 is a second flow chart of a recognition method.

FIG. 4 is a second flow chart of a recognition method according to the present invention. Steps S201 to S206 are same as Steps S101 to S106.

In Step 207, the processing device 30 may select, in a plurality of objects, several object having the similarity reaching a threshold value, and calculate a first confidence value according to the similarity. Steps S208 and S209 are same as Steps S107 and S109.

In Step S210, the processing device 30 generates a second confidence value according to the second sensing signal generated through the response of the user.

In Step S211, the processing device 30 generates an integrated value corresponding to the first confidence value and the second confidence value, and judges the recognition result according to the integrated value.

Figure 5:
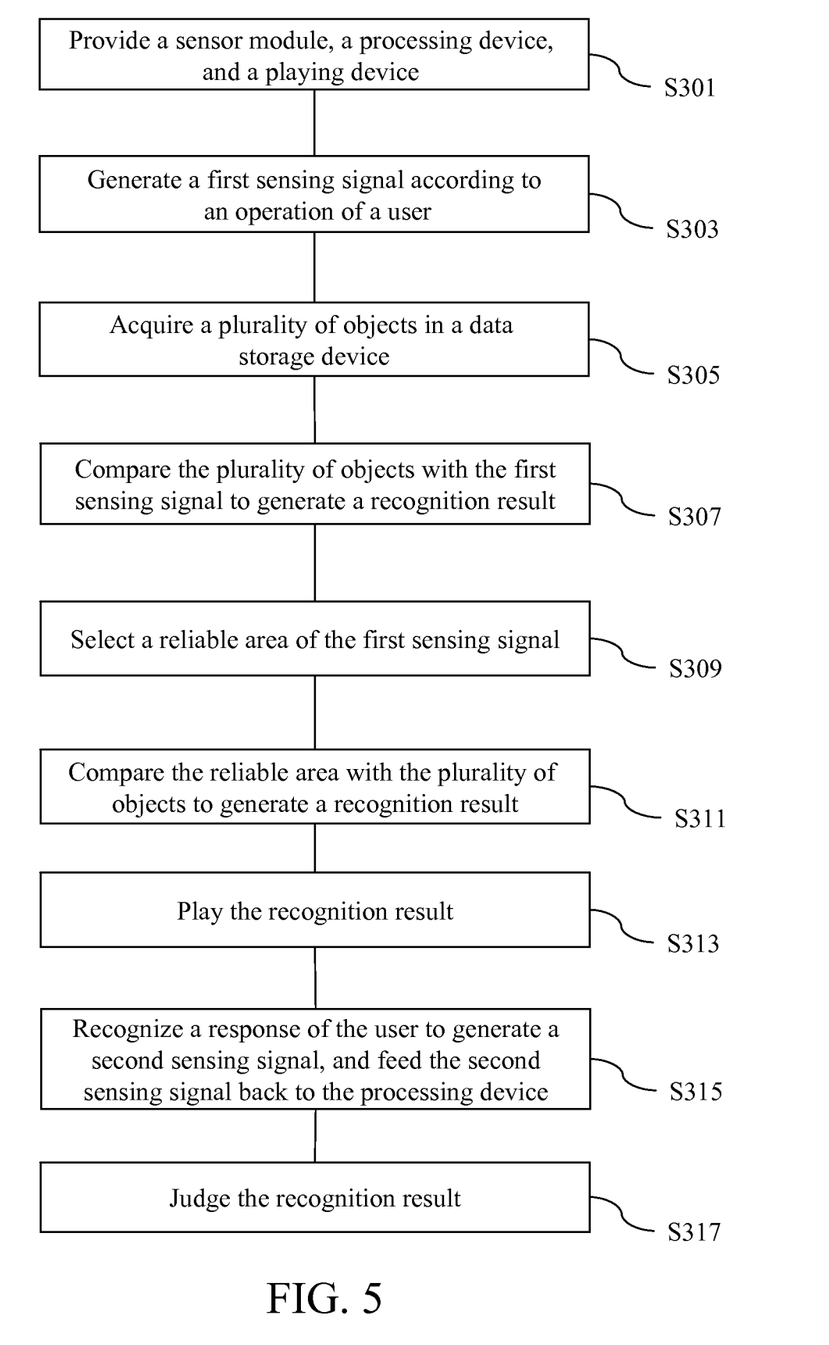
FIG. 5 is a third flow chart of a recognition method.

FIG. 5 is a third flow chart of a recognition method according to the present invention.

Steps S301, S303, S305, and S307 are same as Steps S201, S203, S205, and S206.

In Step S309, a reliable area of the first sensing signal is selected. For example, before Step 309, a first sensing signal, for example, a human face is first displayed on the screen. The human face may present a phenomenon of partially too bright or partially too dark due to influences of the environment light rays. The user may select a part with normal exposure on the screen, so as to increase the probability of correct recognition.

In Step S311, the processing device 30 compares the selected reliable area with the plurality of objects, so as to generate a recognition result.

Steps S313, S315, S317 and Steps S208, S209, and S211 are the same.

Figure 6:
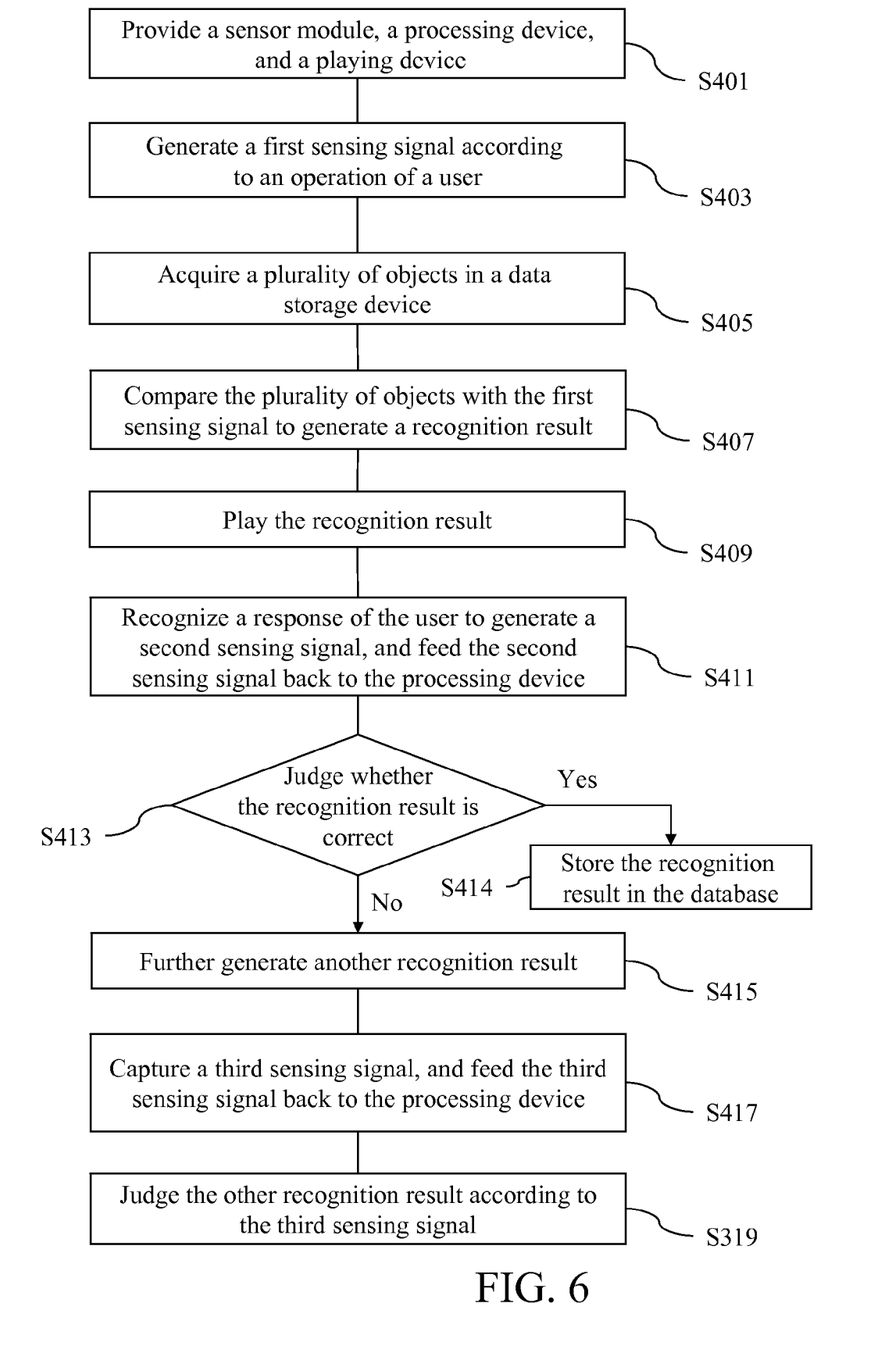
FIG. 6 is a fourth flow chart of a recognition method.

FIG. 6 is a flow chart of a recognition method according to a fourth embodiment of the present invention.

Steps S401 to S411 are same as Steps S201 to S211.

In Step S413, the processing device 30 judges whether the recognition result is correct according to the second sensing signal obtained in Step S411. If the judgment result is correct, Step S414 is performed; and if the judgment result is fault, Step S415 is performed.

In Step S414, the recognition result being judged correct is stored in the data storage device 50, so as to increase the recognition accuracy.

In Step S415, as the recognition result is judged fault, the processing device 30 further generates another recognition result. The other recognition result is one or more objects most similar to the first sensing signal in the plurality of objects in the data storage device other than the recognition result being judged fault.

In Step S417, the sensor module 20 recognizes a response of the user, so as to generate a third sensing signal. The third sensing signal is fed back to the processing device.

In Step S419, the processing device 30 judges whether the other recognition result is correct according to the third sensing signal. In Step 419, if it is judged that the other recognition result is correct, the processing device 30 synchronously determines whether the similarity between the other recognition result and the first sensing signal is higher than a threshold value. When the judgments above are both correct, it is considered that the final recognition result is correct.

Through the recognition system and the recognition method, the recognition result may be first played to the user, so the user can know the recognition result in advance. In addition, the recognition system can detect the response of the user to the recognition result, so as to determine whether the recognition result is correct. Therefore, the recognition system of the present invention is able to effectively increase the detection accuracy.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A recognition system, for recognizing an operation of a user, comprising:
   a sensor module, for generating a first sensing signal according to the operation of the user when detecting the presence of the user, wherein the operation of the user includes the user's voice or movement, and the sensor module comprises:
      a primary sensor device, for recognizing the operation of the user and generating the first sensing signal; and
      a secondary sensor device, for recognizing a response of the user and generating a second sensing signal;
   a data storage device, for storing a plurality of objects;
   a processing device, for comparing the first sensing signal and the plurality of objects to generate only one recognition result in response to the first sensing signal; and
   a playing device, for playing the recognition result;
   wherein after the recognition result is played, the sensor module is used for feeding the second sensing signal back to the processing device, and the processing device judges whether the recognition result is acceptable by analyzing the second sensing signal; and
   wherein the secondary sensor device is a physiological signal sensor used for detecting a physiological signal of an involuntary response, so as to avoid a cheating behavior of the user.

2. The recognition system according to claim 1, wherein the processing device determines the recognition result according to the second sensing signal, and updates the data stored in the data storage device according to the judged recognition result.

3. The recognition system according to claim 1, wherein the processing device generates a first confidence value according to the first sensing signal, and generates a second confidence value according to the second sensing signal, and the processing device judges whether the recognition result is acceptable corresponding to the first confidence value and the second confidence value.

4. The recognition system according to claim 1, wherein the primary sensor device is an image sensor used for generating an image signal, and the processing device compares the plurality of objects with the image signal, and takes one of the objects most similar to the image signal as the recognition result.

5. The recognition system according to claim 1, wherein the primary sensor device is a voice sensor used for generating a voice signal, and the processing device compares the objects with the voice signal, and takes one of the objects most similar to the voice signal as the recognition result.

6. The recognition system according to claim 1, wherein the secondary sensor device is a touch sensor, and the touch sensor comprises a mouse, a keyboard, or a touch screen, so the user responds to the recognition result by touching the secondary sensor device.

7. The recognition system according to claim 1, wherein the secondary sensor device is a non-touch sensor, and the non-touch sensor comprises a sound sensor, an image sensor, or a brain wave sensor, so the user responds to the recognition result without touching the secondary sensor device.

8. The recognition system according to claim 1, wherein the playing device is a display screen used for displaying the recognition result.

9. The recognition system according to claim 1, wherein the playing device is a loudspeaker used for playing the recognition result.

10. A recognition method, comprising:
   providing a sensor module, a processing device, a playing device, and a data storage device;
   generating, by the sensor module, a first sensing signal according to an operation of a user when detecting the presence of the user, wherein the operation of the user includes the user's voice or movement;
   acquiring a plurality of objects in the data storage device;
   comparing, by the processing device, the plurality of objects to generate only one recognition result in response to the first sensing signal;
   playing, by the playing device, the recognition result;
   recognizing, by the sensor module, a response of the user to generate a second sensing signal, and feeding the second sensing signal back to the processing device; and
   judging whether the recognition result is acceptable by analyzing the second sensing signal;
   wherein the sensor module has a primary sensor device and a secondary sensor device, the primary sensor device is used for recognizing the operation of the user and generating the first sensing signal, and the secondary sensor device is used for recognizing the response of the user and generating the second sensing signal; and
   wherein the secondary sensor device is a physiological signal sensor used for detecting a physiological signal of an involuntary response, so as to avoid a cheating behavior of the user.

11. The recognition method according to claim 10, further comprising:
   generating a first confidence value according to the first sensing signal;
   generating a second confidence value according to the second sensing signal; and
   judging whether the recognition result is acceptable corresponding to the first confidence value and the second confidence value.

12. The recognition method according to claim 10, wherein the step of comparing the plurality of objects with the first sensing signal to generate the recognition result further comprises:
   selecting a reliable area of the first sensing signal; and
   comparing the reliable area with the plurality of objects to generate the recognition result.

13. The recognition method according to claim 10, wherein after the step of judging the recognition result, the method further comprises:
   if the recognition result is correct, storing the recognition result in the data storage device.

14. The recognition method according to claim 10, wherein after the step of judging the recognition result, the method further comprises:
   if the recognition result is fault, further generating another recognition result; and
   capturing, by the sensor module, a third sensing signal, feeding the third sensing signal back to the processing device, and judging the other recognition result according to the third sensing signal.

15. The recognition method according to claim 14, wherein after judging the other recognition result, the method further comprises:
   if the other recognition result is correct, determining whether the judgment result satisfies a preset threshold value.

* * * * *